May 20, 1941. H. H. COOK 2,242,511
SHOVEL AND HOIST
Filed March 16, 1939 3 Sheets-Sheet 1
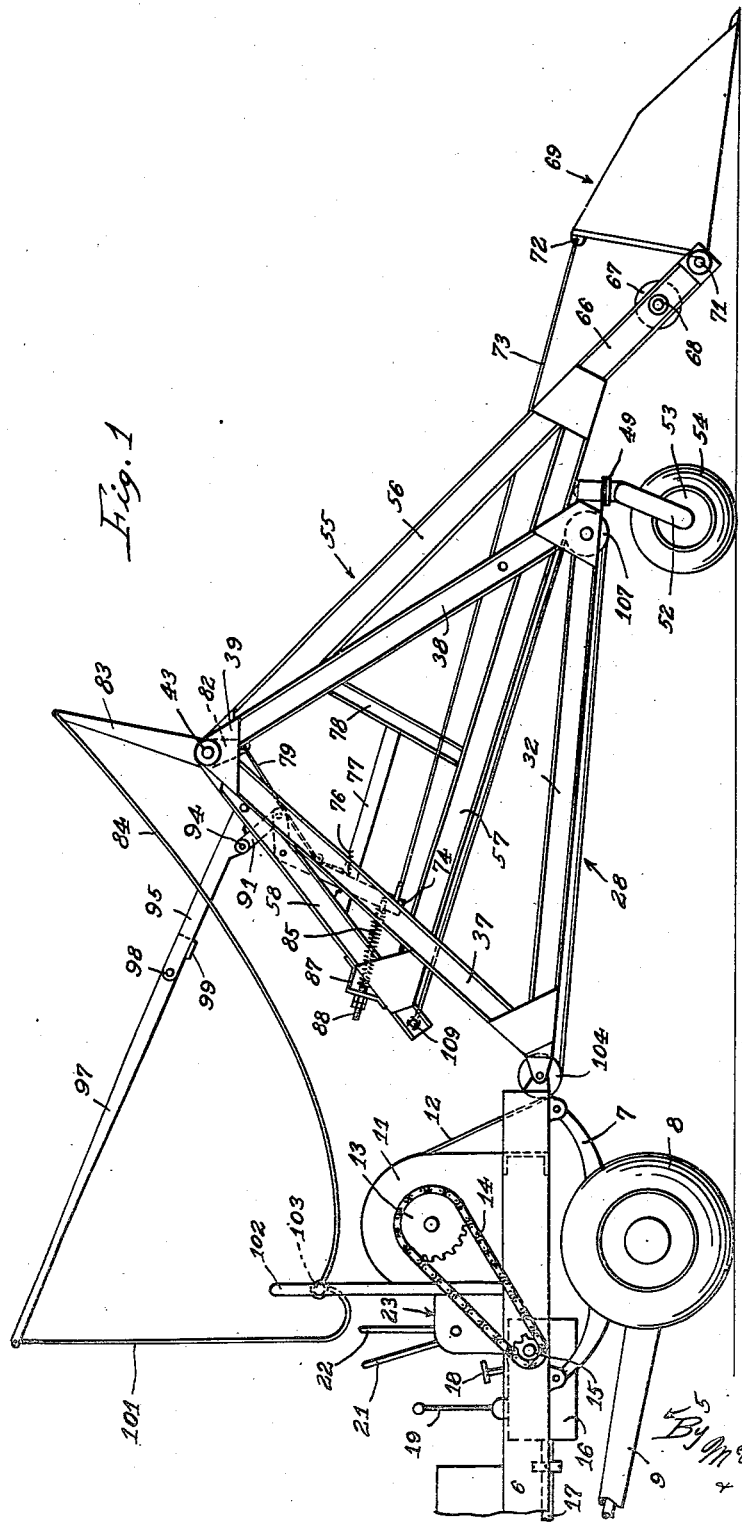
Inventor:
Harold H. Cook
By McCanna, Wintercorn
& Morsbach
Attys.

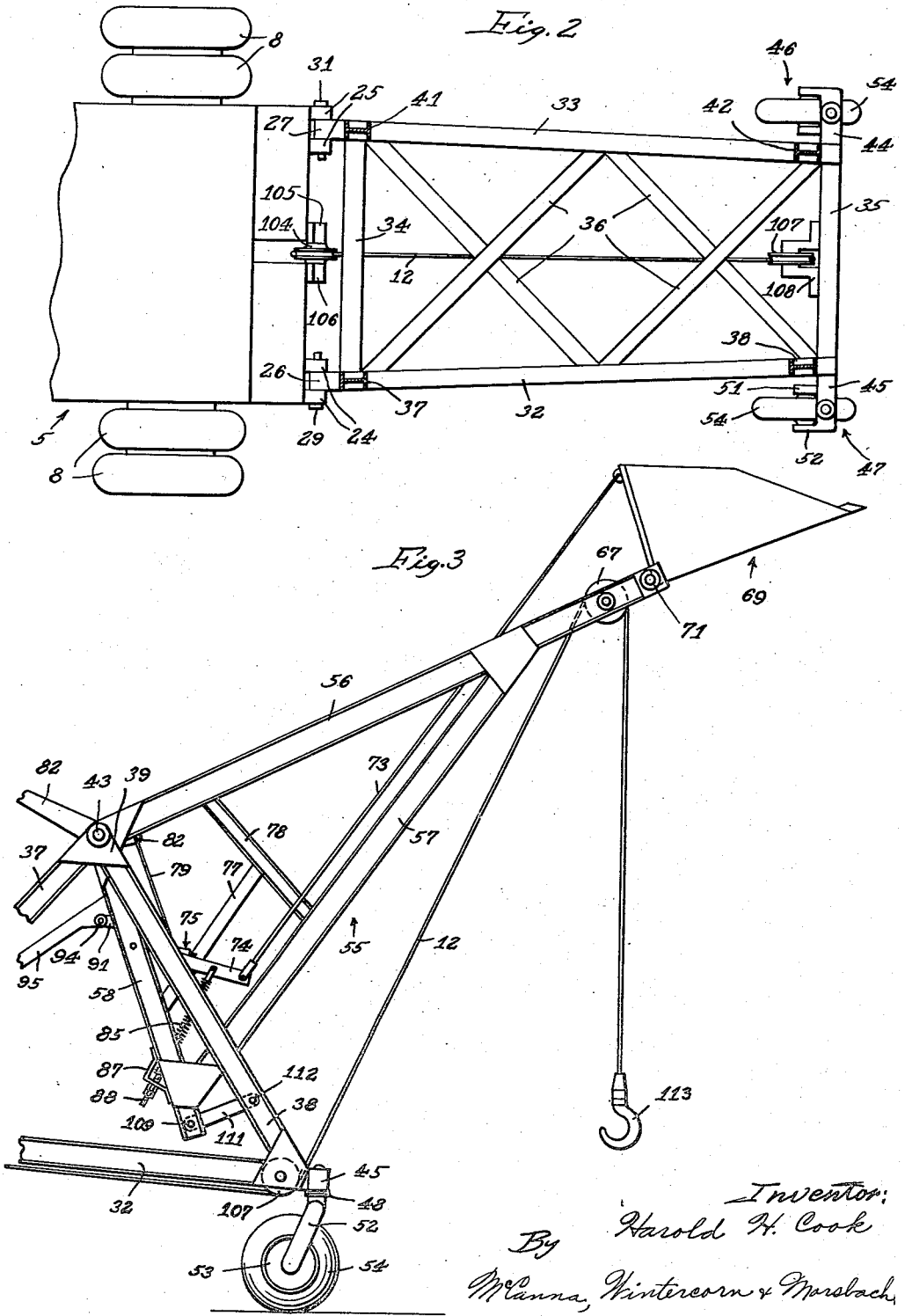

May 20, 1941.  H. H. COOK  2,242,511
SHOVEL AND HOIST
Filed March 16, 1939  3 Sheets-Sheet 3
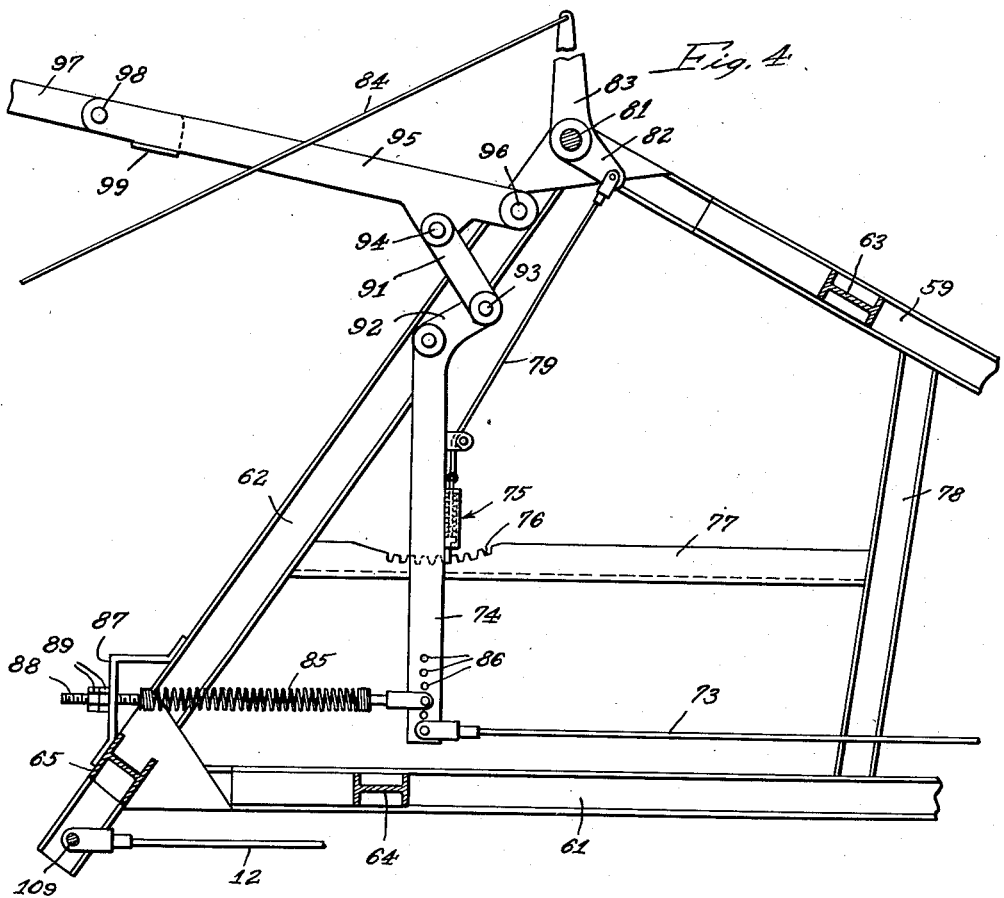
Inventor:
Harold H. Cook
By
McCanna, Wintercorn & Morsbach
Attys.

Patented May 20, 1941

2,242,511

UNITED STATES PATENT OFFICE 2,242,511

SHOVEL AND HOIST

Harold H. Cook, Steward, Ill.

Application March 16, 1939, Serial No. 262,134

7 Claims. (Cl. 214—140)

This invention relates to power operated loading devices and has special reference to portable devices for loading conveyances such as trucks by means of a power operated shovel or for hoisting objects for loading or analogous purposes.

An important object of the invention is the provision of a device of the class described capable of convenient and rapid movement from place to place primarily intended for use on small jobs, such as the loading of gravel and other construction supplies and equipment, whereby to avoid the long delays and the slow and cumbersome operations of moving conveniently shovels, derricks and hoists from job to job.

A further object of the invention is the provision of a novel structure of the character described wherein a hoisting unit is detachably secured to a truck for convenience in service and in transportation, and to permit the truck to be used for other purposes when not in service.

A still further object of the invention is the provision of a shovel having a novel form of hoisting boom, and novel means for operating and for controlling the boom and shovel.

Other objects and advantages will appear from the following description and the accompanying drawings, in which—

Figure 1 is a side elevation of the device showing only the rear portion of the truck;

Fig. 2 is a horizontally disposed view taken just above the bottom frame members;

Fig. 3 is a fragmentary view of the end of the trailing unit showing the boom in elevated position for use with a hoisting line, and Fig. 4 is a fragmentary vertical section through the pivoted end of the boom.

The invention contemplates the provision of a truck or similar automotive vehicle designated generally by the numeral 5 and having a frame 6 supported by means of springs 7 on a plurality of pneumatic tired wheels 8 driven by means of a conventional drive shaft and housing 9. Positioned on the truck frame 6 is a drum housing 11 within which is supported the conventional type of hoist drum upon which an operating cable 12 for the shovel is wound, the drum being driven by a sprocket 13 and chain 14 from a power driven sprocket 15. For the purpose of driving the sprocket 15 a conventional type of transmission and clutch 16 is driven by a shaft 17 constituting a power take-off from the motor of the truck 5 in the usual manner. The transmission and clutch 16 are actuated by the operator through a clutch pedal 18 and transmission lever 19. For the purpose of controlling the rotation of the drum a hand operated brake lever 21 and a hand operated clutch lever 22 are provided which serve to actuate a clutch and brake 23 controlling the rotation of the sprocket 15, the brake and clutch 23 being of the type held into engagement by the levers 21 and 22 in accordance with the usual practice in machines of this sort. The mechanism heretofore described constitutes a windlass supported on the frame of a truck and driven through a power take-off from the engine of the truck. The various instrumentalities described are individually well known in the art, and consequently the structure thereof has not been described. The manner of combining the same and the arrangement thereof, together with the cooperative relationship thereof with the remaining parts of the structure, are believed, however, to constitute a part of the present invention.

Positioned on the rear of the truck frame 6 are two pairs of spaced ears 24 and 25 between each pair of which are received tongues 26 and 27 of a shovel and hoist frame designated generally by the numeral 28, pins 29 and 31 serving to retain the tongues for pivotal movement on a horizontal axis, as will be apparent from Figs. 1 and 2. The frame structure 28 is in this instance formed of structural steel and has horizontal side members 32 and 33, a horizontal front member 34 and a horizontal rear member 35, the horizontal members being reinforced by suitable brace members 36. Secured to the horizontal member 32 are upwardly disposed frame members 37 and 38 attached to the horizontal member 32 at opposite ends thereof, the members 37 and 38 converging and being secured together at the point of convergence by a plate 39. Likewise, upwardly disposed frame members 41 and 42 are secured at opposite ends of the horizontally disposed members 33 and converge in a manner similar to the members 37 and 38 and likewise secured by a plate similar to the plate 39, each of the plates 39 being connected by a transverse shaft 43. It will be understood that the members 37, 38, 41, and 42 are suitably braced in the manner required by structural practice, such braces being omitted in the drawings for the purpose of clarity.

The frame member 35 is so constructed as to provide a rigid bolster having outwardly projecting ends 44 and 45 from which the end of the frame is supported by casters designated generally by the numerals 46 and 47. Each of these casters consist of a stem portion 48 received in the outwardly extending portions 44 and 45 and supported therein for rotation on anti-friction bearings 49, the stem being bifurcated to provide fork members 51 and 52 between and upon which a wheel 53 is supported, the wheel having a pneumatic tire 54. It will be seen that with this construction the casters can swivel about a vertically disposed axis with change in direction of the truck, and likewise these casters carry a considerable proportion of the load occasioned by operation of the shovel or hoist.

Interposed between the upwardly disposed frame members 41 and 42 and the frame members 37 and 38 is a boom designated generally by the numeral 55, the boom being carried for rotation on a horizontal axis on the shaft 43 for movement between the position shown in Figure 1 and that shown in Fig. 3. The boom includes two side members of general triangular shape, one of these side members having sides 56, 57 and 58, while the opposite side member has elements 59, 61 and 62 corresponding thereto, the side members being interconnected by lateral connecting members 63, 64 and 65 in accordance with the usual practice with structural steel. The elements 56 and 59 project beyond the point of the triangle as shown at 66 and have disposed therebetween adjacent to but spaced from their ends a pulley 67 carried on a rod or shaft 68 for rotation, as will presently be described. Pivotally connected directly onto the ends of the elements 56 and 59 and disposed therebetween is a bucket designated generally by the numeral 69, the bucket being pivotally supported thereon at its lower rear corner by means of pivots 71 for rotation with respect to the boom. Attached to the upper rear edge of the bucket as shown at 72 is a trip cable 73 which is trained through the boom and is attached at its opposite end to a latch lever 74 (Fig. 4). The latch lever 74 functions to normally retain the bucket in the position shown in Figure 1, but is so arranged that this position is adjustable within relatively narrow limits for a purpose presently to be described, and the latch lever carries a spring pressed latch 75 adapted to engage a rack 76 on a bar 77 connected between a brace bar 78 and the boom element 62. The latch 75 is actuated in withdrawing movement by means of a cable 79 attached to a trip lever 81 having an arm 82 to which the cable is attached and an arm 83 to which is attached a rope 84 which extends to the truck and to a point of easy accessibility by the operator. A heavy coiled spring 85 is connected at one end to the latch bar 74, the point of connection being adjustable by means of holes 86, and the opposite end of said spring is connected to a bracket 87 fixedly secured on the boom elements, the tension of the spring being adjustable by means of the threaded end 88 supporting the spring and nuts 89 threadedly engaging said end. It will be seen that the spring 85 functions to rotate the latch bar 74 in a clockwise direction facing Fig. 4, thereby rotating the bucket in a counter-clockwise direction facing the figures for the purpose of bringing the bucket into upright position after its load has been dumped.

Means are provided for adjusting the position of the bucket when it occupies its normal loading position as shown in Figure 1, which includes a link 91 connected to an arm 92 rigidly connected with the latch bar 74, the link being pivotally connected thereto as shown at 93 and pivotally connected as shown at 94 to an adjusting lever 95, the adjusting lever being pivotally connected at its end as shown at 96 to the boom. The adjusting lever 95 has an extension 97 (Fig. 1) pivotally connected to the lever 95 as shown at 98 and having a flange 99 arranged to abut against the lower edge of the lever 95 so that the lever 95 may be rotated in a counter-clockwise direction facing the figures by actuation of a rope 101 attached to the outer end of the extension 97 but such that as the boom is moved to the position shown in Fig. 3, the extension 97 can rotate in a clockwise direction with respect to the lever 95. To cause this action to occur the truck frame 6 is provided with uprights 102 adjacent its opposite sides interconnected by a rod 103 against which the extension 93 strikes as the boom is raised to its elevated position. The boom is moved between its positions by means of the cable 12 which is trained over a pulley 104 attached to the rear of the truck frame by means of ears 105 and 106 (Fig. 2). The cable is thence trained over a pulley 107 supported on a bracket 108 attached to the frame member 35 and thence extends along the boom, the end thereof being connected to a rod 109 extending between the boom elements 58 and 62 (note Figs. 1 and 4).

It will be observed that the frame 28 and boom 55 constitutes in effect a separate vehicle adapted to be partially supported on a truck and driven therefrom. The arrangement may be such that this attachment is secured either to the front or the rear of the truck depending upon requirements or convenience, the device in this instance being shown in the trailing position. It will also be seen that the frame structure may be quickly and conveniently detached from the truck so that the truck may be used for separate service. It will also be noted that the frame structure is comparatively light and carried on pneumatic wheels so that it may be rapidly transported over the highways from job to job, and is thus much more mobile than shovel and hoist structures heretofore known.

In use, assuming the parts to be in the position shown in Figure 1, the truck 5 is placed in gear and moved toward the right facing Figure 1 so as to cause the bucket 69 to enter into a pile of sand, gravel or other material to be handled thereby. In this particular instance this movement means movement of the truck in reverse, but where the shovel is placed on the front end of the truck, the opposite movement will be imparted. When the truck has been backed sufficiently to cause the material to fill the bucket 69, the clutch lever 22 is moved into engagement, the drive mechanism 18 and 19 having been previously engaged as heretofore described. The operator holds the clutch lever 22 in engagement while the cable 12 winds up on the drum, causing the boom to rotate about the shaft 43 until the bucket is elevated to the desired height. The clutch lever 22 is thereupon released and the boom is held in this position by ratchet mechanism, not shown but normally present in the drum mechanism 11. Thereupon the truck 5 is driven forward a sufficient distance to permit a vehicle such as a truck to be moved under the bucket 69, whereupon the bucket is dropped by actuation of the rope 84 which releases the latch 75 and permits the bucket to rotate about its pivotal supports 71 against the tension of the spring 85. When the material drops from the bucket its weight changes sufficiently to permit the spring 85 to bring the bucket back to its upright position and bring the latch 75 into engagement with the bracket 76. Thereupon the truck 5 is backed to loading position and the cable 12 is released and controlled in the downward movement of the boom by operation of the brake lever 21. During the upward movement of the boom the extension 97 strikes against the rod 103, rotation about the connection 98 permitting continued movement of the boom. Thereupon the operations are repeated for the purpose of handling a further bucket full of material.

Frequently it is necessary to change the angular relationship between the bottom of the bucket and the boom at the position shown in Figure 1, and for this purpose the rack 76 is provided. For example, it is frequently desirable to tilt the outer end of the bucket downward while the bucket is entering the pile of material so as to scrape closely over the surface of the ground. This is accomplished by allowing the latch 75 to engage the first few teeth of the rack 76. In this position the shovel is caused to enter the material and means are provided for bringing up the forward edge of the shovel prior to rotation of the boom. This means includes the latch bar 74, the link 91, the lever 95, the extension 96, and the rope 101. To accomplish this the operator pulls downward on the rope 101 and simultaneously actuates the trip rope 84 to remove the latch 75 from the rack 76, thus causing rotation of the latch bar 74 in a clockwise direction facing Figs. 1 and 4 until the parts occupy substantially the position of Fig. 4. Thereupon the trip rope 84 is released, allowing the latch to engage the rack 76 at this point, thus holding the bucket in its proper position for elevation by operation of the cable 12 and the boom 55.

Referring now more particularly to Fig. 3, I have therein shown the manner in which the device may be used as a conventional hoist without any material alteration in the construction. For this purpose the cable 12 is wound onto the drum to elevate the outer end of the boom 55 to the position shown in Fig. 3, whereupon links 111 carried on the rod 109 adjacent opposite sides of the boom are connected to the frame members 38 and 42 by means of pins 112 passing through the frame member and through the links to thus retain the boom in the position shown in Fig. 3. Thereupon the end of the cable 12 is disengaged from the rod 109, trained over the pulley 67 and allowed to depend therefrom, the conventional hook as shown at 113 being attached to the end of the cable. With this arrangement rotation of the drum causes the hook 113 to move upward or downward vertically, so that the hook may be engaged with an object on the ground and elevated for reception in a truck, or may be transported from place to place in a suspended position through movement of the truck. It can, of course, be used in the reverse manner for unloading or analogous purposes.

It will also be observed that a conventional clam shell bucket or drag line bucket can also be operated from the boom 55 in the usual manner by the addition to the unit herein described of additional winding cable and drum so that the device is highly adaptable for shoveling and hoisting operations of the general type described.

While I have thus shown and described a specific embodiment of the device, it will be understood that numerous alterations and changes may be made therein within the scope of the invention and the appended claims, in which—

I claim:

1. The combination in a power operated shovel and hoist, of a boom formed in the general shape of a triangle having a short side and two relatively long sides, means for pivotally supporting the boom at the junction between the short side and one of said long sides, means at the junction between said short side and the other of said long sides for the attachment of an actuating cable to rotate the boom, a bucket pivotally supported at the junction between the long sides of the triangle, and means within the triangle manually operable to latch the bucket in any of a number of positions and to release the bucket for rotation under the weight of its contents.

2. The combination in a power-operated shovel and hoist of a frame structure including a base and laterally spaced uprights, a boom formed in the general shape of a triangle, means for pivotally supporting said boom at one corner at an elevated point on said frame, a bucket carried on said boom at a second corner thereof, a cable for rotating said boom connected at the third corner thereof and trained forwardly toward said bucket and rearwardly toward the opposite end of said frame structure to provide a loop, means for pivotally supporting said frame structure on an automotive vehicle for rotation on a horizontal axis extending transversely of the frame, and a pulley disposed substantially on said axis against which said cable bears, said pulley acting to guide the cable in its movement with rotation of the boom.

3. The combination in a power-operated shovel and hoist of a frame structure including a base and laterally spaced uprights, a boom formed in the general shape of a triangle, a shaft connecting said uprights at an elevated point, means for supporting said boom at one corner thereof between said uprights for rotation on said shaft, a bucket pivotally supported at a second corner thereof and projecting beyond the end of said frame structure, means within the triangle operable to latch the bucket in any of a number of different positions, and separate means projecting to a point remote from said boom for engaging the latch in any of said positions and for releasing said latch for rotation of the bucket under the weight of its contents.

4. The combination in a power-operated shovel of a frame structure, a boom supported on said frame structure at an elevated point for rotation on a horizontal axis, a bucket pivotally carried on the end of said boom for movement with rotation of the boom between a low position adjacent the ground and an elevated position, and means for inserting the bucket into the work at the low point and depositing the contents of the shovel from said elevated point comprising at least one caster wheel for supporting one end of said frame structure, an automotive vehicle, and releasable means interposed between the opposite end of said frame structure and the end of said vehicle for moving the frame structure through a bucket inserting movement and for returning the shovel to a remote depositing position in response to movement of the vehicle, said releasable means comprising laterally spaced pivotal connections between the vehicle and the frame structure arranged on a horizontal axis transverse to the direction of travel to provide relative movement therebetween in one direction only and to support a part only of the weight of said frame structure on said vehicle.

5. The combination in a power-operated shovel adapted for use with an automobile vehicle of a frame structure comprising a base and laterally spaced uprights, a boom comprising a triangular structure supported at one corner for rotation on a horizontal axis through the points of said uprights and projecting beyond one end of said frame structure, a bucket pivotally supported on a second corner forming the end of said boom beyond said frame for movement with the boom between a lower position adjacent the ground and an elevated position, a cable acting on the third corner of said boom for rotating the same, at least one caster wheel for supporting one end of said frame, and means for attaching the end of said frame opposite said bucket to the end of an automotive vehicle for movement of the bucket into the work in said low position and away from the work for discharge of the contents thereof in the elevated position comprising laterally spaced pivotal connections with said vehicle arranged on a horizontal axis to support the other end of said frame structure, transmit bucket-loading thrust therebetween and prevent relative angular movement of the vehicle and frame structure in a horizontal plane upon bucket-loading movement of the vehicle.

6. The combination recited in claim 5 having latch means for retaining the bucket in upright position, means for releasing the latch means to permit inversion of the bucket, and means for adjusting the upright position of the bucket.

7. The combination recited in claim 5 having latch means for retaining the bucket in upright position, manually operated means for releasing said latch means to permit inversion of the bucket, and means for returning the bucket to upright position.

HAROLD H. COOK.